US007285236B2

(12) United States Patent
Chung

(10) Patent No.: US 7,285,236 B2
(45) Date of Patent: Oct. 23, 2007

(54) INJECTION METHOD OF INSERTING SPRING INTO MULTIFUNCTIONAL ACTUATOR

(75) Inventor: Seuk Hwan Chung, Kyungki-do (KR)

(73) Assignee: Samsung Electro-Mechanics Co., Ltd., Kyungk-Do (KR)

( * ) Notice: Subject to any disclaimer, the term of this patent is extended or adjusted under 35 U.S.C. 154(b) by 598 days.

(21) Appl. No.: 10/734,151

(22) Filed: Dec. 15, 2003

(65) Prior Publication Data

US 2005/0129260 A1 Jun. 16, 2005

(51) Int. Cl.
*B29C 45/14* (2006.01)

(52) U.S. Cl. .................. 264/160; 264/271.1; 264/275; 264/279

(58) Field of Classification Search ................ 264/156, 264/160, 271.1, 275, 279; 425/121
See application file for complete search history.

(56) References Cited

U.S. PATENT DOCUMENTS 3,008,181 A * 11/1961 Fitz et al. ................ 264/297.6
5,137,674 A * 8/1992 Braconier ................... 264/161
2004/0022408 A1* 2/2004 Mango et al. .............. 381/408

OTHER PUBLICATIONS

Patent Abstracts of Japan, Publication No. 02-096799, Apr. 9, 1990.
Patent Abstracts of Japan, Publication No. 2001-211499, Aug. 3, 2001.

* cited by examiner

*Primary Examiner*—Jill L. Heitbrink
(74) *Attorney, Agent, or Firm*—Lowe Hauptman Ham & Berner

(57) ABSTRACT

A multi-actuator selectively performing audio and vibration generating operations is made by injection molding process of inserting a spring into a case forming an exterior appearance of the multi-actuator. The spring is inserted into the case using an exterior structure integrally formed with the spring, and the exterior structure is cut off from the case after the injection process is finished. In the method of inserting the spring into the case, a plurality of guide holes are formed on the exterior structure and outside springs in a spring array state, and the springs are disposed and inserted into the injection-molding in the array state so that a productivity is improved. Since interference between the springs and the injection molding, deformation of the springs is prevented.

3 Claims, 4 Drawing Sheets

INJECTION METHOD OF INSERTING SPRING INTO MULTIFUNCTIONAL ACTUATOR

BACKGROUND OF THE INVENTION

1. Field of the Invention

The present invention relates to a multi-actuator, and more particularly, to a method of insertion-molding a spring into a case of a multi-actuator.

2. Description of the Related Art

Generally, a multi-functional actuator has functions to generate receiving signals, such as an audio signal and a vibration signal which are converted from a signal received as an electrical signal or from a pre-stored bell or melody signal, as a received call signal. Such a multi-functional actuator having the above functions has been used in a mobile telecommunication terminal, such as a wireless phone or a pager.

FIG. 1 shows a structure of a conventional multi-functional actuator. Referring to FIG. 1, the multi-actuator includes a case 108 having an inside space and a groove formed on an inside wall thereof, a vibration plate 101 having an outside portion fixedly coupled to an upper side of the case 101 to generate an audio signal, a voice coil 102 coupled to a lower-portion of the vibration plate 101, a magnet 104 vertically magnetized, an upper plate 103 mounted on the magnet 104 to form a magnet field, a yoke 105 forming the magnetic field with the magnet 104, a weight 106 forming a vibration body with the yoke 105, springs 107 and 109 fixedly coupled to grooves of the case 101, a lower grill 111 coupled to a lower side of the case 108, and a vibration coil 110 mounted on the grill 111 to generate the vibration using a magnetic force formed by the magnetic field.

The case 108 forming an exterior appearance of the multi-actuator is made of thermal plastic material, polycarbonate (PC) or polybuthyleneterephthalate (PBT) among general engineered plastic is used as the thermal plastic material.

The springs 107 and 109 are fixedly coupled to the case 108 of the multi-actuator using a method of coupling the springs 107 and 109 to the case 108 by inserting and assembling the springs 107 and 109 to an injection molding of the case 108 or another method of attaching the springs 107 and 109 to the case 108 with a bonding material.

The springs 107 and 109 can be more fixedly coupled to the case 108 suing the method of inserting the springs 107 and 109 into the case injection molding than the another method of bonding the springs 107 and 109 to the case 108, and a manufacturing process of the injection molding method is more simple than the bonding method. However, the injection molding method is disadvantage that the springs 107 and 109 can be deformed or distorted during inserting and insertion-molding the springs 107 and 109 into the case 108.

FIG. 2 is a view showing the spring 107 or 109 manufactured by the insert injection method and used in the multi-actuator shown in FIG. 1.

Generally, grooves 107*a* formed inside the springs 107 and 109 to be used as a guide, so as for the springs 107 and 109 to be individually inserted into the case 108 in the case injection mold.

FIG. 3 is the case and the spring inserted in the case of the multi-actuator shown in FIG. 1.

When the injection molding is injected in the in a case that the groove 107*a* and an inside of the spring 107 are used as the guide, and a problem occurs, that is, the height of the spring 208 with respect to the case 108 varies due to the interference with a guide pin coupled to the spring 107 which in supported by the guide pin. Accordingly, an assembling characteristic of the multi-actuator made using the above method deteriorates.

SUMMARY OF THE INVENTION

In order to solve the above and/or other problems, it is an aspect of the present invention to improve a method of inserting a spring into a case injection mold to assemble the spring and a case.

It is another aspect of the present invention to improve the efficiency of an injection molding in which a spring and a case of a multi-actuator are to prevent deformation of the spring inserted into the case in the injection mold.

Additional aspects and advantages of the invention will be set forth in part in the description which follows and, in part, will be obvious from the description, or may be learned by practice of the invention.

To achieve the above and/or other aspects, there is provided a insertion-molding method of inserting a spring into a case of a multi-actuator selectively performing audio and vibration generating operation, the method including placing on a case injection-mold a spring array, which includes a plurality of springs, using an external structure integrally formed with the spring array, forming the case by injecting resin of a liquid state into the case injection mold, and separating the external structure from the springs.

According to another aspect of the present invention, the placing of the spring array on the case injection mold comprises inserting a guide pin of the case injection mold into a guide hole of the external structure.

According to another aspect of the present invention, the placing of the spring array on the case injection mold includes inserting one or more guide pins of the case injection mold into corresponding ones of one or more guide holes of the external structure.

According to another aspect of the present invention, the separating of the external structure from the case includes forming a V-shaped notch between the external structure and the case.

To achieve the above and/or other aspects, there is provided a multi-actuator selectively performing audio and vibration generating operations and including a case, a vibration plate disposed on a first portion of the case to generate an audio signal, a magnet, a spring integrally formed with a second portion of the case to elastically support the magnet and a weight with respect to the case, and a vibration coil disposed on a third portion of the case to form a magnetic field with the magnet to generate a vibration signal, the multi-actuator including a portion of a notch shape formed on an outer surface of the case.

According to another aspect of the present invention, the portion of the notch is a portion of a V-shape.

According to another aspect of the present invention, the outer surface of the case is disposed on a portion of the case extended from the spring in a direction parallel to a major surface of the spring.

According to another aspect of the present invention, the spring vibrates with respect to the major surface.

According to another aspect of the present invention, the spring comprises a first sub-spring and a second sub-spring, the weight is disposed between the first and second sub-springs, the outer surface of the case comprises a first sub-surface and a second sub-surface corresponding to respective first and second sub-springs, and the first and second sub-surfaces of the case are disposed on portions of the case extended from corresponding ones of the springs in a direction parallel to each major surface of the springs.

BRIEF DESCRIPTION OF THE DRAWINGS

These and/or other advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
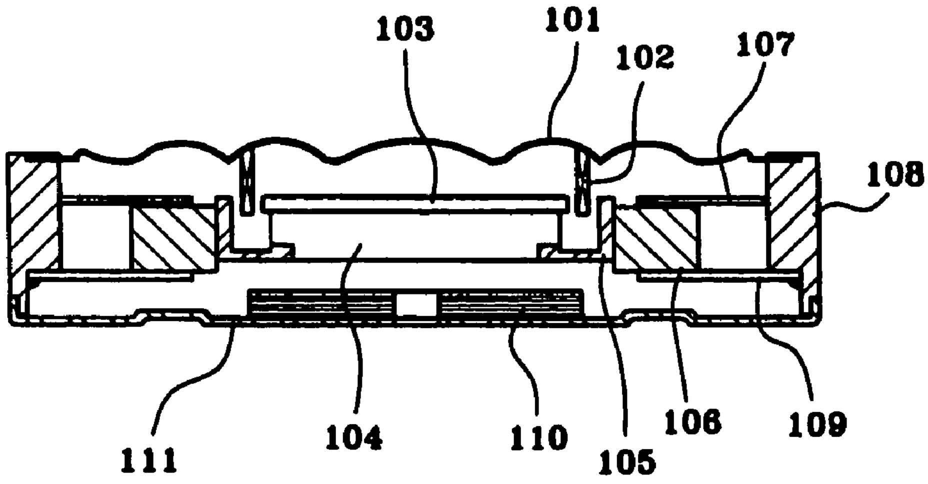
(PRIOR ART) FIG. 1
FIG. 1 is a cross-sectional view of a conventional multi-actuator.

Reference will now be made in detail to the present preferred embodiments of the present invention, examples of which are illustrated in the accompanying drawings, wherein like reference numerals refer to the like elements throughout. The embodiments are described below in order to explain the present invention by reference to the figures.

According to an aspect of the present invention, during a molding process of inserting the spring into a case which forms an exterior appearance of a multi-actuator selectively performing audio and vibration generating operations, the spring is inserted into a case injection mold to form a case using an external structure integrally formed with the spring, and the exterior structure is cut off from the spring of the case injection-molded in the case injection mold.

Figure 2:
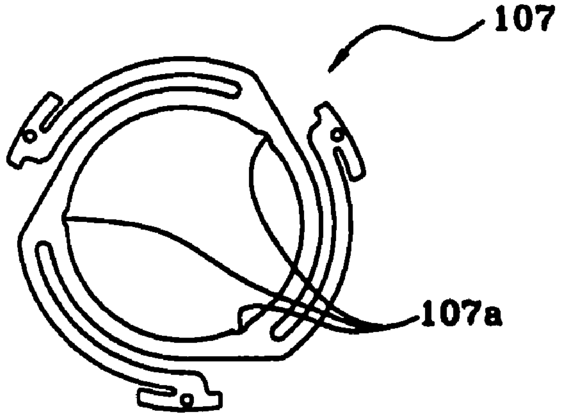
(PRIOR ART) FIG. 2
FIG. 2 is a view showing a spring manufactured by an insert injection method and used in the multi-actuator shown in FIG. 1.
Figure 3:
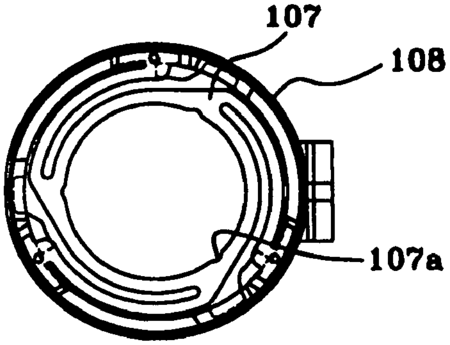
(PRIOR ART) FIG. 3
FIG. 3 is a case and the spring inserted in the case of the multi-actuator shown in FIG. 1.

That is, the injection molding method of inserting the spring into the case injection mold to form the case of the multi-actuator does not use a groove 107*a* formed inside a spring 107 of FIGS. 2 and 3 but at least one guide hole formed on an outside portion of the spring of a spring array, i.e., the eternal structure to be used to guide the spring into the case in a spring array state with respect to the case injection mold.

It is another aspect of the present invention to prevent the deformation of the spring by avoiding interference with the spring during the injection molding process after the spring is inserted into the case injection mold to integrally form the case with the spring.

Figure 4:
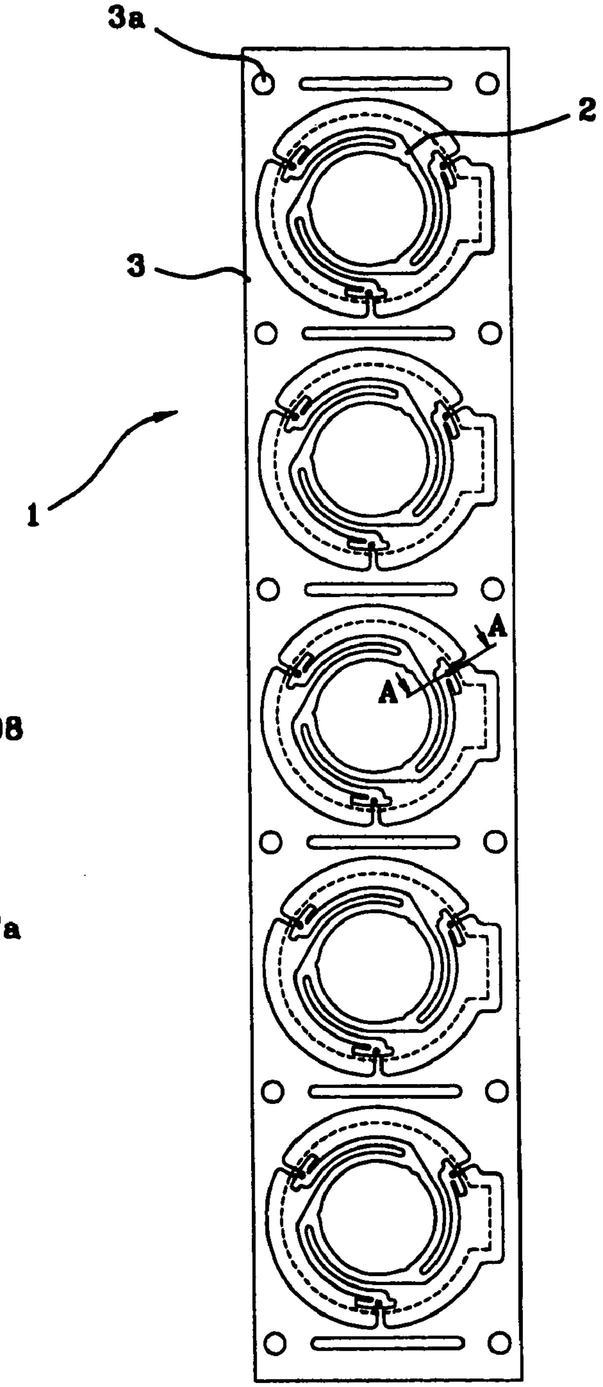
FIG. 4 is a view showing a spring of a spring array to be used in a multi-actuator according to an embodiment of the present invention.
Figure 5:
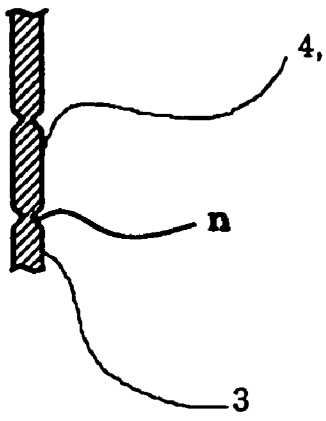
FIG. 5 is a cross-sectional view taken along a line A-A' of the FIG. 4 to show a V-shaped notch formed between an external structure and a case having a spring of the multi-actuator.
Figure 6:
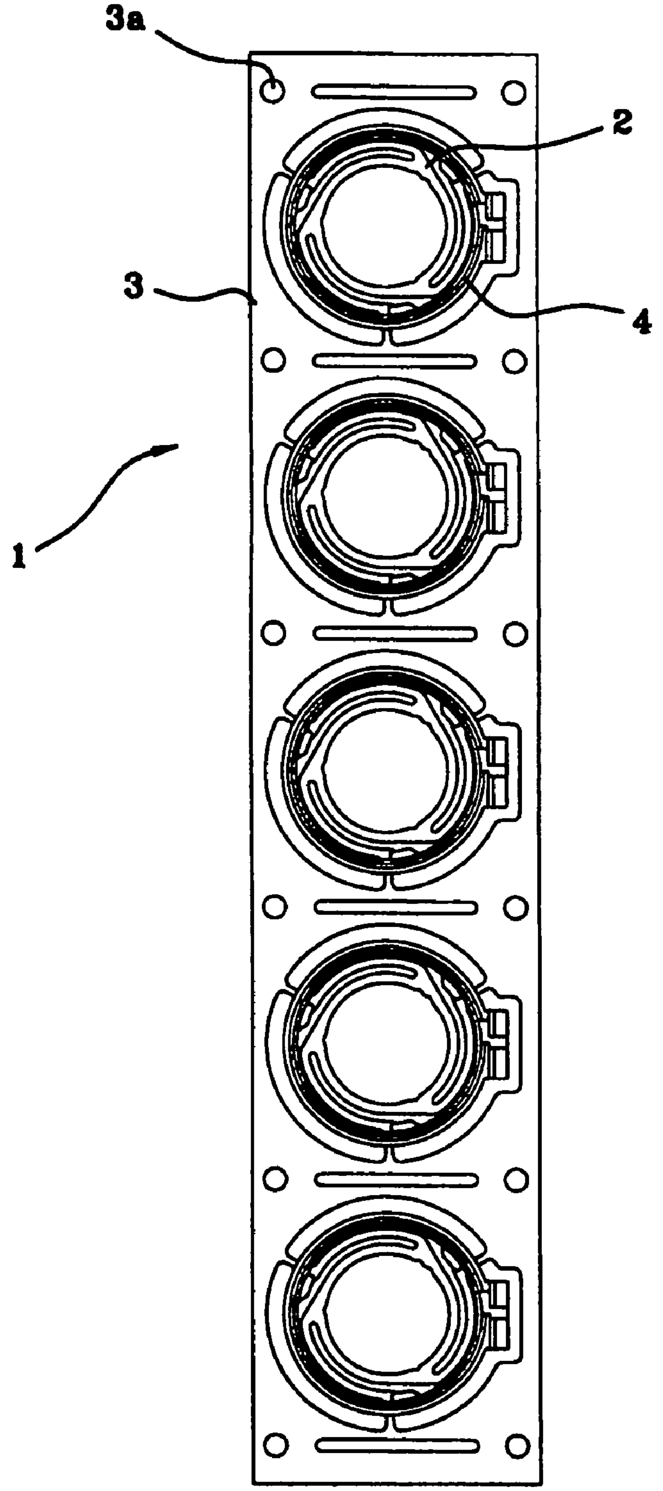
FIG. 6 is a view showing a state of the spring array of the case after the spring array is injection-molded.

FIG. 4 is a view showing one or more springs 2 of a spring array 1 to be used in a multi-actuator according to an embodiment of the present invention. FIG. 5 is a cross-sectional view taken along a line A-A' of the FIG. 4 to show a V-shaped notch n formed between an external structure 3 and a case 4 integrally formed with the springs 2 of the multi-actuator. FIG. 6 is a view showing a state of the spring array 1 of the case 4 after the spring array 1 is injection-molded in a case injection mold to form an integrated case 4 with the corresponding one of the springs 2.

Referring to FIGS. 4 through 6, the spring array 1 includes a plurality of the springs 2 and the external structure 3 having one or more guide holes 3*a* and integrally formed with the springs 2. The number of the springs 2 in the spring array 1 is 4 or 5. However, the present invention is not limited thereto.

Compared with the groove 107*a* formed on the spring 107 and used as a guide as shown in FIGS. 2 and 3, the guide holes 3*a* are not formed inside the springs 2 but outside the springs 2, that is, the external structure 3 surrounding the springs 2 in a circular direction, thereby guiding the springs 2 throughout circular circumferences of the springs 2.

Moreover, the exterior structure 3 formed outside the springs 2 is used as an assembling standard corresponding to an accurate position of the case injection mold to assemble the springs 2 and the case 4.

A method of inserting the spring 2 into the case injection mold to form the case 4 integrated with the spring 2 will be explained with reference with FIGS. 4 through 6 hereinafter.

The spring array 1 of FIG. 4 is disposed in the case injection mold, and one or more guide pins of the case injection mold are inserted into corresponding ones of the guide holes 3*a* of the external structure 3 to couple the springs 2 into the case injection mold. Resin of a liquid state is injected into the case injection mold so that the case 4 integrated with the springs 2 of the spring array in an array state is obtained.

FIG. 6 is a view showing a state of the spring array 1 formed with the case 2 after the spring array 1 is injection-molded in the case injection mold.

The case 4 including springs 2 is connected to the external structure 3 through a notch “n” as shown in FIG. 5. Therefore, the multi-actuator can be obtained by separating the external structure 3 from the case 4 integrally formed with the springs 2.

Since the notch “n” is formed between the external structure 3 and the case 4 or the springs 2, and the external structure 3 is separated from the case with respect to the notch “n,” a portion of the notch “n” remains on the case 4 integrally formed with a corresponding one of the springs 2. Accordingly, an outside circumferential surface of the case 4 integrally formed with the spring 2 of the multi-actuator includes a portion of a notch shape corresponding to the notch “n.” The portion of the notch shape of the notch “n” remaining on the case 4 and/or spring 2 of the multi-actuator when the external structure 3 is separated from the case 4 and/or spring 2, is decreased when being ground by a grinding device.

The multi-actuator selectively performing audio and vibration generating operations includes the case 4, a vibration plate disposed on a first portion of the case 4 to generate an audio signal, a magnet, the springs 2 integrally formed with a second portion of the case to elastically support the magnet and a weight with respect to the case, and a vibration coil disposed on a third portion of the case 4 to form a magnetic field with the magnet to generate a vibration signal.

Figure 7:
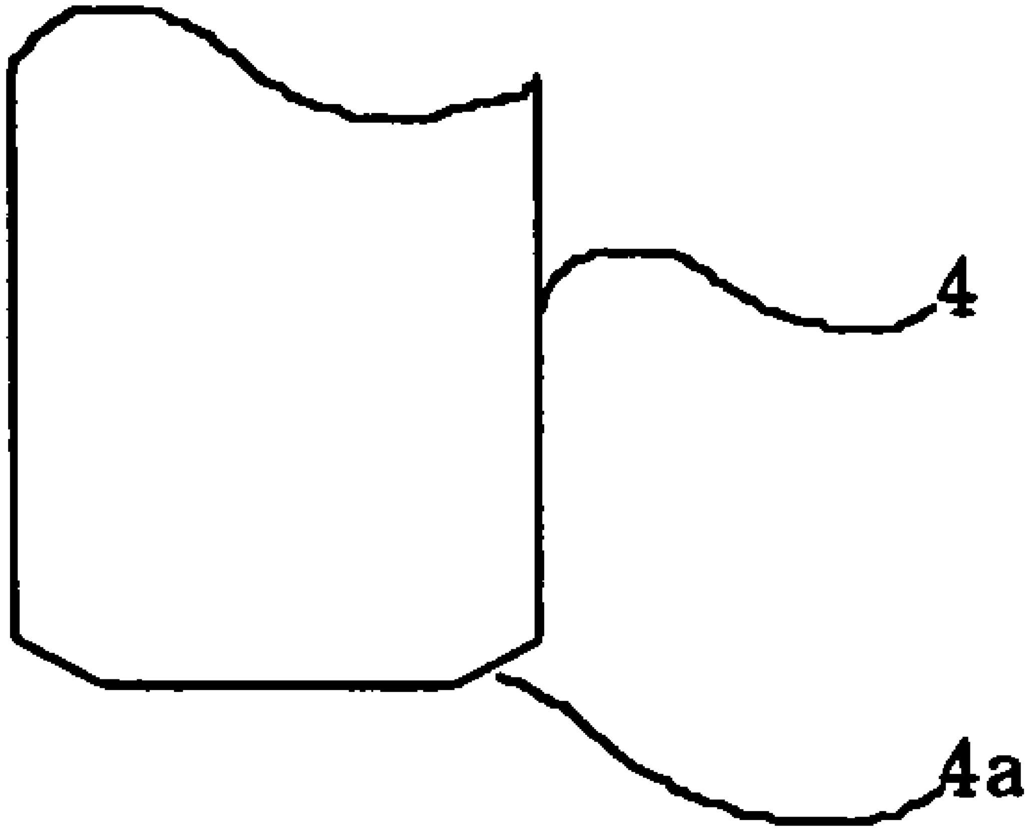
FIG. 7 is a view showing a portion of a notch formed on a case of the multi-actuator formed by a method shown in FIGS. 4 through 6 according to another embodiment of the present invention.

Although a portion of a structure of the multi-actuator vibrator is similar to a structure of a conventional multi-actuator of FIG. 1, the structure of the multi-actuator vibrator according to the above embodiment of the present invention is different from the conventional multi-actuator of FIG. 1. That is, the multi-actuator further includes a portion 4*a* of a notch shape formed on an outer surface of the case 4 as shown in FIG. 7. The portion 4*a* of the notch "n" is a portion of a V-shape. The outer surface of the case 4 is disposed on a portion of the case 4 extended from the spring 2 in a direction parallel to a major surface of the spring 2. The spring 2 vibrates with respect to the major surface.

The spring 2 may include a first sub-spring and a second sub-spring so that the weight is disposed between the first and second sub-springs. The outer surface of the case 4 includes a first sub-surface and a second sub-surface corresponding to respective first and second sub-springs, and the first and second sub-surfaces of the case 4 are disposed on portions of the case 4 extended from corresponding ones of the springs 2 in a direction parallel to each major surface of the springs 2.

As described above, during the case injection molding process, the deformation of the springs is prevented, and the springs are easily inserted into the case, thereby increasing a productivity and liability of the spring. Since the deformation of the springs is prevented because of using a portion of the external structure as a guide, the interference with the springs is prevented, and characteristics of the multi-actuator does not deteriorate.

Although a few preferred embodiments of the present invention have been shown and described, it would be appreciated by those skilled in the art that changes may be made in this embodiment without departing from the principle and sprit of the invention, the scope of which is defined in the claims and their equivalent.

What is claimed is:

1. An insertion-molding method of inserting a spring into a case of a multi-actuator selectively performing audio and vibration generating operations, the method comprising:

forming a spring array within an external structure such that the spring array is integrally formed with the external structure, the spring array comprising a plurality of springs, and wherein a connecting portion comprising a V-shaped notch connects each of the plurality of springs to the external structure;

placing on a case injection mold the spring array;

forming the case by injecting resin of a liquid state into the case injection mold such that the V-shaped notch is exterior to the case and one of the plurality of springs is molded within the case; and separating the external structure from the springs at the V-shaped notch.

2. The method of claim 1, wherein the placing of the spring array on the case injection mold comprises inserting a guide pin of the case injection mold into a guide hole of the external structure.

3. The method of claim 1, wherein the placing of the spring array on the case injection mold comprises inserting one or more guide pins of the case injection mold into corresponding one or more guide holes of the external structure.

* * * * *